United States Patent
Prentice et al.

(10) Patent No.: US 12,459,037 B2
(45) Date of Patent: Nov. 4, 2025

(54) STRUCTURAL SIMULATION OF ADDITIVELY MANUFACTURED COMPONENTS

(71) Applicant: BAE Systems plc, London (GB)

(72) Inventors: Matthew James Prentice, Preston (GB); Steven Robert Barnes, Balderstone (GB); Austin James Cook, Balderstone (GB); Stephen Arthur Morgan, Bristol (GB)

(73) Assignee: BAE Systems plc, London (GB)

(*) Notice: Subject to any disclaimer, the term of this patent is extended or adjusted under 35 U.S.C. 154(b) by 482 days.

(21) Appl. No.: 18/011,769

(22) PCT Filed: Jun. 4, 2021

(86) PCT No.: PCT/GB2021/051399
§ 371 (c)(1),
(2) Date: Dec. 20, 2022

(87) PCT Pub. No.: WO2021/260340
PCT Pub. Date: Dec. 30, 2021

(65) Prior Publication Data
US 2023/0264264 A1 Aug. 24, 2023

(30) Foreign Application Priority Data
Jun. 25, 2020 (EP) .................. 20275113
Jun. 25, 2020 (GB) .................. 2009704

(51) Int. Cl.
*B22F 10/28* (2021.01)
*B22F 10/25* (2021.01)
(Continued)

(52) U.S. Cl.
CPC .......... *B22F 10/28* (2021.01); *B22F 10/25* (2021.01); *B29C 64/393* (2017.08); *B22F 10/85* (2021.01);
(Continued)

(58) Field of Classification Search
CPC .......... B22F 10/28; B22F 10/25; B22F 10/85; B22F 10/80; B29C 64/393; B33Y 10/00;
(Continued)

(56) References Cited

U.S. PATENT DOCUMENTS

| | | | |
|---|---|---|---|
| 2020/0130281 A1 | 4/2020 | Sudo | |
| 2020/0393813 A1* | 12/2020 | Gupta | B33Y 50/02 |

FOREIGN PATENT DOCUMENTS

| | | |
|---|---|---|
| JP | 2019521875 A | 8/2019 |
| WO | 2017196344 A1 | 11/2017 |
| WO | 2018235150 A1 | 12/2018 |

OTHER PUBLICATIONS

International Search Report and Written Opinion for PCT Appl. No. PCT/GB2021/051399, Sep. 23, 2021, 21 pages.
(Continued)

*Primary Examiner* — Michael J Brown
(74) *Attorney, Agent, or Firm* — Maine Cernota & Curran (57) ABSTRACT

A method of estimating a property of an article manufactured, at least in part, by additive manufacturing, AM, preferably directed energy deposition, DED, and/or powder bed fusion, PBF, is described. The method implemented, at least in part, by a computer comprising a processor and a memory. The method comprises: obtaining a set of in-process parameters of the AM of the article, wherein respective parameters of the set thereof have positional information associated therewith; inferring a set of attributes of the article corresponding to the set of in-process parameters, wherein respective attributes of the set thereof have the
(Continued)

positional information associated therewith; and estimating the property of the article based, at least in part, on the inferred set of attributes.

11 Claims, 1 Drawing Sheet

(51) Int. Cl.
| | |
|---|---|
| *B29C 64/393* | (2017.01) |
| *B22F 10/80* | (2021.01) |
| *B22F 10/85* | (2021.01) |
| *B33Y 10/00* | (2015.01) |
| *B33Y 30/00* | (2015.01) |
| *B33Y 40/00* | (2020.01) |
| *B33Y 50/00* | (2015.01) |
| *G06N 7/01* | (2023.01) |
| *G06N 20/00* | (2019.01) |
| *G16C 60/00* | (2019.01) |

(52) U.S. Cl.
CPC ............... *B33Y 10/00* (2014.12); *B33Y 30/00* (2014.12); *B33Y 40/00* (2014.12); *B33Y 50/00* (2014.12); *G06N 7/01* (2023.01); *G16C 60/00* (2019.02)

(58) Field of Classification Search
CPC ......... B33Y 30/00; B33Y 40/00; B33Y 50/00; G06N 7/01; G06N 20/00; G16C 60/00; Y02P 10/25
USPC ....................................................... 700/119
See application file for complete search history.

(56) References Cited

OTHER PUBLICATIONS

Kafka O L: "Experiment-Based Simulations for Heterogeneous Hierarchical Materials: Application to Metal Additive Manufacturing", Proquest Dissertations and Theses Global 2020 Proquest LLC USA, 2020, Northwestern University, US., XP002801295.

Jack Francis et al: "Deep Learning for Distortion Prediction in Laser-Based Additive Manufacturing using Big Data", Manufacturing Letters, vol. 20, Apr. 1, 2019 (Apr. 1, 2019), NL, pp. 10-14, XP055739395, ISSN: 2213-8463, DOI: 10.1016/j.mfglet.2019.02.001.

Yang Y P et al: "Prediction of microstructure, residual stress, and deformation in laser powder bed fusion process", Computational Mechanics, Springer, Berlin, DE, vol. 61, No. 5, Dec. 12, 2017 (Dec. 12, 2017), pp. 599-615, XP036503809, ISSN: 0178-7675, [retrieved on Dec. 12, 2017], DOI: 10.1007/S00466-017-1528-7.

Lingbin Meng et al: "Machine Learning in Additive Manufacturing: A Review", JOM: Journal of Metals, vol. 72, No. 6, Apr. 17, 2020 (Apr. 17, 2020), United States, pp. 2363-2377, XP055709376, ISSN: 1047-4838, DOI: 10.1007/s11837-020-04155-y.

Luke Scime et al: "Using machine learning to identify in-situ melt pool signatures indicative of flaw formation in a laser powder bed fusion additive manufacturing process", Additive Manufacturing, vol. 25, Jan. 1, 2019 (Jan. 1, 2019), NL, pp. 151-165, XP055740072, ISSN: 2214-8604, DOI: 10.1016/j.addma.2018.11.010.

International Preliminary Report on Patentability for PCT Appl No. PCT/GB/2021/051399, 12 pages.

GB Search Report for Appl. No. GB2009704.4 mail date Apr. 14, 2021, 4 pages.

EP Search Report for Appl. No. EP20275113.7 mail date Dec. 15, 2020, 9 pages.

* cited by examiner

STRUCTURAL SIMULATION OF ADDITIVELY MANUFACTURED COMPONENTS

RELATED APPLICATIONS

This application is a national phase application filed under 35 USC § 371 of PCT Application No. PCT/GB2021/051399 with an International filing date of Jun. 4, 2021, which claims priority of GB Patent Application 2009704.4 filed Jun. 25, 2020 and EP patent application No. 20275113.7 filed Jun. 25, 2020. Each of these applications is herein incorporated by reference in its entirety for all purposes.

FIELD OF THE INVENTION

The present invention relates to additive manufacturing. Particularly, the present invention relates to estimating properties of articles manufactured, at least in part, by additive manufacturing.

BACKGROUND

Additive manufacturing (AM), popularly known as three-dimensional (3D) printing, generally refers to processes used to create articles (also known as components, parts or objects) from layers including one or more different materials sequentially formed under computer control. AM provides creation of articles having complex geometries (i.e. shapes or structures), including internal voids, that may not readily be formed according to conventional subtractive manufacturing processes, such as machining, or conventional casting or moulding processes. Materials suitable for AM include metals, ceramics, glasses and polymers.

Estimation of properties of articles, for example fatigue life prediction or remnant fatigue life prediction, generally assumes homogeneous, isotropic, defect-free and/or design geometry articles. However, articles manufactured by AM may be heterogeneous, for example due to graded material, anisotropic, for example due to sequential layer by layer formation thereof and/or due to in-process variability, may comprise defects, for example internal defects, and/or may deviate geometrically from intended design geometries, thereby resulting in article to article variability.

Hence, there is a need to estimate properties of articles manufactured by AM.

SUMMARY OF THE INVENTION

It is one aim of the present invention, amongst others, to provide a method of estimating a property of an article manufactured by AM which at least partially obviates or mitigates at least some of the disadvantages of the prior art, whether identified herein or elsewhere. For instance, it is an aim of embodiments of the invention to provide a method of estimating a property of an article manufactured by AM that improves an accuracy and/or precision of structural simulation of the article.

A first aspect provides a method of estimating a property of an article manufactured, at least in part, by additive manufacturing, AM, preferably directed energy deposition, DED, and/or powder bed fusion, PBF, the method implemented, at least in part, by a computer comprising a processor and a memory, the method comprising:

obtaining a set of in-process parameters of the AM of the article, wherein respective parameters of the set thereof have positional information associated therewith;

inferring a set of attributes of the article corresponding to the set of in-process parameters, wherein respective attributes of the set thereof have the positional information associated therewith; and estimating the property of the article based, at least in part, on the inferred set of attributes.

A second aspect provides a method of determining a property of an assembly comprising a set of articles, the method implemented, at least in part, by a computer comprising a processor and a memory, the method comprising estimating properties of the respective articles of the set thereof according to the first aspect.

A third aspect provides a method of training a machine learning, ML, algorithm, the method implemented, at least in part, by a computer comprising a processor and a memory, the method comprising:

providing training data comprising sets of in-process parameters of AM of a set of articles including a first article and corresponding sets of properties of the set of articles; and training the ML algorithm using the provided training dataset.

A fourth aspect provides a machine learning, ML, algorithm trained according to the method of the third aspect.

A fifth aspect provides a computer comprising a processor and a memory configured to implement a method according to the first aspect, the second aspect and/or the third aspect.

A sixth aspect provides a computer program comprising instructions which, when executed by a computer comprising a processor and a memory, cause the computer to perform a method according to the first aspect, the second aspect and/or the third aspect.

A seventh aspect provides a non-transient computer-readable storage medium comprising instructions which, when executed by a computer comprising a processor and a memory, cause the computer to perform a method according to the first aspect, the second aspect and/or the third aspect.

DETAILED DESCRIPTION OF THE INVENTION

Method of Estimating a Property of an Article Manufactured by AM

The first aspect provides a method of estimating a property of an article manufactured, at least in part, by additive manufacturing, AM, preferably directed energy deposition, DED, and/or powder bed fusion, PBF, the method implemented, at least in part, by a computer comprising a processor and a memory, the method comprising:

obtaining a set of in-process parameters of the AM of the article, wherein respective parameters of the set thereof have positional information associated therewith;

inferring a set of attributes of the article corresponding to the set of in-process parameters, wherein respective attributes of the set thereof have the positional information associated therewith; and estimating the property of the article based, at least in part, on the inferred set of attributes.

In this way, the property, for example a mechanical property, of the article manufactured by the AM may be estimated from the set of in-process AM parameters. That is, the estimated property is specifically of the particular article. Notably, the set of in-process AM parameters are spatially resolved, having the positional information associated respectively therewith, and the corresponding inferred set of attributes of the article are analogously spatially resolved, similarly having the positional information associated respectively therewith. In this way, heterogeneity, anisotropy, defects and/or geometric deviations of the particular article are accounted for in the inferred set of spatially resolved attributes. In this way, mechanical performance, for example, of the particular article may be predicted. In contrast, conventional prediction of properties of articles generally assumes bulk (i.e. non-spatially resolved) attributes and thus may not accurately and/or precisely predict the properties of individual articles. Instead, by inferring the set of spatially resolved attributes of the particular article, prediction of properties of the particular article is improved, for example having improved accuracy and/or precision.

Property

The method is of estimating, for example predicting or calculating, the property of the article manufactured by the AM. It should be understood that the property of the article is a material property thereof that is determined by the AM, for example resulting from heterogeneity, anisotropy, defects and/or geometric deviations due, at least in part, to the AM.

In one example, the property is a material property i.e. an intensive property, for example a physical property such as an acoustical property, a chemical property, an electrical property, an environmental property, a magnetic property, a mechanical property, an optical property, a radiological property or a thermal property. Acoustical properties include acoustical absorption, speed of sound, sound reflection, sound transfer and third order elasticity. Chemical properties of interest include corrosion resistance and reactivity. Electrical properties include capacitance, dielectric constant, dielectric strength, electrical resistivity and conductivity, electric susceptibility, electrostriction, magnetoelectric polarizability, Nernst coefficient, permittivity, piezoelectric constant, pyroelectric effect and Seebeck coefficient. Magnetic properties include Curie temperature, diamagnetism, Hall coefficient, hysteresis, magnetostriction, magnetocaloric coefficient, magnetothermoelectric power, magnetoresistance, permeability, piezomagnetism, pyromagnetic coefficient and Spin Hall effect. Mechanical properties include brittleness, bulk modulus, coefficient of restitution, compressive strength, creep, density, ductility, durability, elasticity, elastic limit, fatigue life, fatigue limit, flexibility, flexural modulus, flexural strength, fracture toughness, friction coefficient, hardness, malleability, mass diffusivity, plasticity, Poisson's ratio, resilience, shear modulus, shear strength, slip, specific modulus, specific strength, specific weight, stiffness, surface roughness, tensile strength, toughness, ultimate tensile strength, viscosity, yield strength and Young's modulus. Optical properties include absorbance, birefringence, colour, electro-optic effect, luminosity, optical activity, photoelasticity, photosensitivity, reflectivity, refractive index, scattering and transmittance. Thermal properties include coefficient of thermal expansion, Curie point, emissivity, glass transition temperature, heat of vaporization, melting point, specific heat capacity, thermal conductivity, thermal diffusivity and thermal expansion.

In one example, the method is of estimating a mechanical property of the article manufactured by the AM. In one example, the mechanical property is selected from a group consisting of: a brittleness, a bulk modulus, a coefficient of restitution, a compressive strength, a creep, a density, a ductility, a durability, an elasticity, an elastic limit, a fatigue life, a fatigue limit, a flexibility, a flexural modulus, a flexural strength, a fracture toughness, a friction coefficient, a hardness, a malleability, a mass diffusivity, a plasticity, a Poisson's ratio, a resilience, a shear modulus, a shear strength, a slip, a specific modulus, a specific strength, a specific weight, a stiffness, a surface roughness, a tensile strength, a toughness, an ultimate tensile strength, a viscosity, a yield strength and a Young's modulus. In one preferred example, the mechanical property is selected from a group consisting of: a compressive strength, a creep, an elasticity, an elastic limit, a fatigue life, a fatigue limit, a flexibility, a flexural modulus, a flexural strength, a fracture toughness, a hardness, a shear modulus, a shear strength, a specific modulus, a specific strength, a stiffness, a tensile strength, a toughness, an ultimate tensile strength, a yield strength and a Young's modulus.

Article

The method is of estimating the property of the article.

In one example, the article comprises and/or is an aerospace component, such as an airframe component, a vehicle component, such as an engine component, or a medical component, such as an implantable medical device.

Heterogeneity, Anisotropy, Defects and/or Geometric Deviations

Generally, heterogeneity in AM may include microstructural and/or mechanical heterogeneity. Microstructural heterogeneity may be due to phase constitution, layer banding, microstructural coarsening, grain morphology, microstructural feature size, processing deficiencies and heterogeneous recrystallisation. Mechanical heterogeneity may include location-dependent, particularly Z axis dependent, tensile properties, hardness and fracture toughness.

Generally, anisotropy in AM may include microstructural and/or mechanical anisotropy. Microstructural anisotropy may result from grain morphology such as epitaxial columnar grains aligned parallel to the build direction (which may in turn give rise to mechanical anisotropy) crystallographic texture and lack of fusion defects. Mechanical anisotropy may result from build direction, thus exhibiting an orientation dependence, and may be apparent in tensile properties, fracture toughness, compressive properties and fatigue properties.

Generally, defects in AM include porosity, residual stresses, cracking, delamination, balling, geometric defects and dimensional accuracy (such as shrinkage, warping and super elevated edges), surface defects, microstructural homogeneities and impurities (such as inclusions, contaminants and surface oxides). These defects adversely affect properties of the article. For example, porosity impacts fatigue performance and crack growth while shrinkage and warping vary article geometry.

Generally, these defects in AM may be induced by the AM equipment, the AM process, the AM model and/or the AM feed material. Defects induced by the AM equipment may result from, for example, beam scanning, build chamber including protective atmosphere, feed material handling and deposition and the baseplate. Defects induced by the AM process may result from, for example, control settings (such as laser power, scan speed and hatch distance which determine energy density) and scan strategies (which may determine temperature distribution and residual stresses, for example). Defects induced by the AM model may result from design errors, supports and sacrificial components and orientation of the article the respect of base plate. Defects induced by the AM feed material may result from purity and contaminants and for powders, from powder morphology, particle size distribution, flowability and apparent density.

Generally, geometric deviations (for example, build errors and/or distortions) result from positional resolution of the AM and/or stresses, such as mechanical and/or thermal stresses, induced or developed during the AM.

Additive Manufacturing

ISO/ASTM 52900-15 defines seven categories of AM processes, including binder jetting, directed energy deposition (DED), material extrusion, material jetting, powder bed fusion (PBF), sheet lamination, and vat photopolymerization. These AM processes are known.

Particularly, DED and PBF techniques, such as direct metal laser sintering (DLMS), selective heat sintering (SHS), selective laser sintering (SLS), selective laser melting (SLM), laser metal deposition (LMD) and electron beam melting (EBM), are suitable for creating (i.e. manufacturing, forming) for example, metal articles, from feed materials such as metal powders and/or wires (also known as filaments). Similarly, polymeric articles may be manufactured from feed materials such as powders and/or filaments comprising polymeric compositions, for example including thermoplastics. The feed materials are heated to elevated temperatures, including melting thereof.

In one example, the AM comprises and/or is DED, for example wire or powder DED or LMD, and/or PBF, for example DMLS, SHS, SLS, SLM or EBM.

In one example, the method comprises manufacturing the article, at least in part, by the AM. In one example, the method comprises manufacturing the article, at least in part, by the AM and wherein obtaining the set of in-process parameters of the AM of the article comprises obtaining the set of in-process parameters of the AM of the article during (i.e. while, simultaneously with) manufacturing the article, at least in part, by the AM.

In one example, manufacturing the article, at least in part, by the AM conforms with or exceeds ISO/ASTM52911 Jan. 19 Additive manufacturing—Design—Part 1: Laser-based powder bed fusion of metals, mutatis mutandis. In one example, the method conforms with or exceeds ASTM F2924-14 Standard Specification for Additive Manufacturing Ti-6 Aluminum-4 Vanadium with Powder Bed Fusion, mutatis mutandis. In one example, the method conforms with or exceeds ASTM F3055-14a Standard Specification for Additive Manufacturing Ni Alloy (UNS N07718) with Powder Bed Fusion, mutatis mutandis. In one example, the method conforms with or exceeds ASTM F3184-16 Standard Specification for Additive Manufacturing Stainless Steel Alloy (UNS S31603) with Powder Bed Fusion, mutatis mutandis. In one example, the method conforms with or exceeds ASTM F3091/F3091M-14 Standard Specification for Powder Bed Fusion of Plastic Materials, mutatis mutandis. In one example, the method conforms with or exceeds proposed new ASTM standard, WK46188, Practice for Metal Powder Bed Fusion to Meet Rigid Quality Requirements, mutatis mutandis.

In one example, manufacturing the article, at least in part, by the AM comprises post-processing, for example heat treating. For example, the as-additive manufactured article may be heat treated after removal thereof from the build chamber. Typically, the as-additive manufactured article is heat-treated whilst on the base plate, after cleaning of excess powder, and the base plate subsequently removed. In one example, the heat treating comprises stress relieving (to thereby reduce distortion, for example upon removing the baseplate, and/or to reduce stresses, in use) and/or to influence microstructure. In this way, the heat treating may affect, for example improve, properties such as mechanical properties of the article. In the present context, a relationship between the respective in-process parameters and inferred set of attributes thereof would then be particular to the same post-processing being applied to the articles and the datasets defining the relationship between parameters and attributes (same if no heat treatment was used). An algorithm may be able to accommodate different heat treatments with sufficient training data (or a very advanced materials model), but for the built part, post-build heat treatment may be an input variable to the algorithm in this instance.

Feed Material

In one example, manufacturing the article, at least in part, by the AM comprises manufacturing the article, at least in part, by the AM, from a feed material, for example comprising a powder and/or a wire.

It should be understood that the powder comprises particles that are solid and may include discrete and/or agglomerated particles. In one example, the particles have an irregular shape, such as a spheroidal, a flake or a granular shape.

Generally, the feed material may comprise any material amenable to fusion by melting, such as metals or polymeric compositions.

The feed material may comprise a polymeric composition comprising a polymer, for example, a thermoplastic polymer. The thermoplastic polymer may be a homopolymer or a copolymer. The thermoplastic polymer may be selected from a group consisting of polymethyl methacrylate (PMMA), acrylonitrile butadiene styrene (ABS), aliphatic or semi-aromatic polyamides, polylactic acid (polylactide) (PLA), polybenzimidazole (PBI), polycarbonate (PC), polyether sulfone (PES), polyetherimide, polyethylene (PE), polypropylene (PP), polymethylpentene (PMP) and polybutene-1 (PB-1), polystyrene (PS) and polyvinyl chloride (PVC).

The powder may comprise a ceramic, for example a refractory material, sand, $SiO_2$, SiC, $Al_2O_3$, $SizN_3$, $ZrO_2$. Ceramic particles may have regular, such as spherical, cuboidal or rod, shapes and/or irregular, such as spheroidal, flake or granular, shapes (also known as morphologies).

In one example, the feed material comprises a metal or an alloy thereof. In one example, the metal is a transition metal, for example a first row, a second row or a third row transition metal. In one example, the metal is Sc, Ti, V, Cr, Mn, Fe, Co, Ni, Cu or Zn. In one example, the metal is Y, Zr, Nb, Mo, Tc, Ru, Rh, Pd, Ag or Cd. In one example, the metal is Hf, Ta, W, Re, Os, Ir, Pt, Au or Hg. In one example, the metal is a group 1 metal such as Li, Na or K; group 2 metal such as Be, Mg, Ca or Sr; group 3 metal such as Sc, Y or La; or group 13 metal such as Al, Ga or In. In one example, the feed material comprises one or more of these metals, for example an alloy. In one example, the alloy comprises one or more non-metallic alloying additions. Generally, the powder may comprise any metal from which particles may be produced by atomisation. These particles may be produced by atomisation, such as gas atomisation, close-coupled gas atomisation, plasma atomisation or water atomisation, or other processes known in the art. These particles may have regular, such as spherical, shapes and/or irregular, such as spheroidal, flake or granular, shapes.

For L-PBF of Ti alloys for example, the powder preferably comprises particles having a size in a range from 15 μm to 45 μm and/or in a range from 20 μm to 63 μm, while for EBM of Ti alloys, the powder preferably comprises particles having a size in a range from 45 μm to 105 μm. For L-PBF of Ni, Al alloys and stainless steels for example, the powder preferably comprises particles having a size in a range from 15 μm to 53 μm, while for EBM of Ni, Al alloys and stainless steels, the powder preferably comprises particles having a size in a range from 50 μm to 150 μm.

In one example, the feed material comprises an additive, an alloying addition, a flux, a binder and/or a coating. In one example, the powder comprises particles having different compositions, for example a mixture of particles having different compositions.

In one example, the metal comprises a ferrous alloy or a nonferrous alloy, for example a stainless steel, an Al alloy, a copper alloy, a Ti alloy, a Ni alloy or mixtures of respective alloys thereof, preferably corresponding and/or compatible alloys (for example having similar or the same nominal compositions) thereof.

In one preferred example, the feed material comprises and/or consists of a Ti alloy, for example a Ti-6AI-4V alloy, as described below, according to AMS 4911R, AMS 4928W, AMS 4965K and AMS 4905F.

In one example, the feed material comprises and/or is a Ti alloy selected from: Carpenter CT PowderRange Ti64 S® available to ASTM Grade 5 and Grade 23, available from Carpenter Technology Corporation (USA); Osprey Ti-6AI-4V Grade 5 ® and/or Osprey Ti-6Al-4V Grade 23 ®, available from Sandvik AB (Sweden); CPTi-Gr.1, Gr.2, Ti64-Gr. 5, Gr. 23, Ti6242, Ti5553 and/or Beta 21S, available from GKN Sinter Metals Engineering GmbH (Germany). Similar Ti alloys include: LPW Ti6-4 High Performance Titanium; UNS R56400/R56407; 3D Systems Ti Gr.23; Concept Laser CL 41 TI ELI; EOS Ti64ELI; Renishaw Ti6Al4V ELI-0406; SLM Solutions TiAI6V4; and TRUMPF TitaniumT: 64 ELI-A LMF. In one example, the feed material comprises and/or is a Ni alloy selected from: Osprey Alloy 625 ® and/or Osprey Alloy 718 ®, available from Sandvik AB (Sweden); IN625, IN718, and/or Ni—Ti, available from GKN Sinter Metals Engineering GmbH (Germany). In one example, the feed material comprises and/or is an Al alloy selected from: AlSi7Mg, AlSi10Mg, and/or Al4047, available from GKN Sinter Metals Engineering GmbH (Germany). In one example, the feed material comprises and/or is an stainless steel selected from: 304L, 316L, 420, and/or 17-4PH, available from GKN Sinter Metals Engineering GmbH (Germany). In one example, the feed material comprises and/or is an Fe alloy selected from: 4340, 4630, 5120, 8620, 20MnCr5, 42CrMo4, 1.2709, H13, Fe—Si and/or Fe—Ni, available from GKN Sinter Metals Engineering GmbH (Germany).

Computer

The method is implemented, at least in part, by a computer comprising the processor and the memory. Suitable computers are known.

In-Process Parameters

The method comprises obtaining the set of in-process parameters of the AM of the article. It should be understood that in-process parameters may include input and/or output parameters, as described below in more detail.

Respective parameters of the set thereof have the positional information associated therewith. In other words, each obtained in-process parameter is spatially resolved, having associated positional information, for example a coordinate, such as a 3 dimensional, 3D, coordinate or an XYZ coordinate, for example with respect to a datum. In one example, respective parameters of the set thereof correspond with respective voxels (i.e. volumetric pixels) of the article, wherein the respective positional information is of the respective voxels.

In one example, respective parameters of the set thereof have temporal information associated therewith. In other words, each obtained in-process parameter may have associated temporal information, for example a time stamp, for example an absolute time or with respect to a reference time, such as start time of AM. In this way, respective in-process parameters of the AM of the article may be obtained from measurements of the AM recorded as a function of time.

In one example, obtaining the set of in-process parameters of the AM of the article comprises monitoring output parameters, for example emissions such as optical, thermal, and/or acoustic emissions, during the AM of the article.

Generally, output parameters may also be referred to as process signatures, which may include observable signatures and derived signatures. Observable signatures may be measured or sensed during the AM, for example using in situ sensors. Derived signatures may be determined, for example calculated, using analytical models or simulations.

In situ sensors suitable for AM include non-contact temperature measurement, for example using pyrometers and IR sensors, including 1D, 2D and 3D sensors, for example for NIR to LWIR sensing, optical sensing in the visible range, low-coherence interferometric imaging, 2D laser displacement sensors, optical coherence tomography devices, accelerometers, ultrasound detectors, strain gauges, thermocouples and X-ray detectors. Sensors may be configured coaxially, for example for IR imaging, or off axially. In this way, output parameters may be obtained at rates compatible with the AM, for example at the spatial resolution of the AM.

For PBF and DED, for example, observable signatures may relate to the melt pool, the plasma, the track along the scan path, the slice and for PBF, the powder bed (i.e. the layer of powder before fusion thereof).

In-process parameters related to the melt pool include size (for example area or diameter), shape, temperature intensity (average or cumulative) and/or temperature profile (1D profiles along the transversal and longitudinal direction or 2D profile over the entire area). The melt pool properties may determine the geometrical accuracy of the track, surface and/or geometrical properties of the article, porosity of the component, incomplete melting and/or development of residual stresses, cracking and/or delamination. The melt pool may be monitored in situ using pyrometery, imaging (visible to NIR) and/or thermal imaging (NIR to LWIR), and acoustic sensors.

In-process parameters related to the plasma (for example ionised plasma resulting from laser or electron beam melting) include temperature and composition. Generally, optical, thermal and/or acoustic emissions originate from the melt pool and the ionised plasma. These are coupled phenomenon, but are separate sources of signals. The melt pool will emit as determined by its temperature, usually at longer peak wavelength to the plasma. Some material will be ionised on interaction with the incident laser and may emit in spectral bands as well as black body radiation. The plasma may be monitored in situ using pyrometery, imaging (visible to NIR) and/or thermal imaging (NIR to LWIR), acoustic sensors and/or spectroscopy.

In-process parameters related to the track include geometry, temperature profile and/or material ejected from the melt pool and surrounding area. The geometry and the temperature profile of the track enable determination of defects such as balling, lack of fusion, local overheating, surface and geometric errors and/or porosity formation. Material ejection may be relevant for characterisation of by products and/or local composition. The track may be monitored in situ using pyrometery, imaging (visible to NIR), thermal imaging (NIR to LWIR) and/or interferometric imaging.

In-process parameters related to the slice include surface pattern, geometry (including deviation from nominal geometry), local thickness profile and/or temperature profile over the entire slice (usually a 2D profile). These parameters enable reconstruction of the actual shape of a printed slice made layer by layer basis, for example. The slice may be monitored in situ using imaging (visible to NIR), thermal imaging (NIR to LWIR) and/or interferometric imaging.

In-process parameters related to the powder bed include bed uniformity, temperature and/or temperature profile. For example, the temperature stability from one layer to the next layer and the 2D temperature profile in each layer may be used to characterise temporal and/or spatial evolution of the AM. The powder bed may be monitored in situ using pyrometery, imaging (visible to NIR), thermal imaging (NIR to LWIR) and/or interferometric imaging. Analogously, in-process parameters may relate to powder or wire feed for DED.

Additionally and/or alternatively, observable signatures may be obtained from vibration, ultrasonic emission and/or baseplate distortion.

In one example, obtaining the set of in-process parameters of the AM of the article comprises sourcing input parameters of the AM of the article and/or readback parameters during the AM of the article. Generally, input parameters include desired control settings, such as desired laser power, desired scan speed and desired hatch distance, while readback parameters include actual control settings, such as actual laser power, actual scan speed and actual hatch distance. For example, while the desired laser power may be constant, the actual laser power may vary during the AM.

Attributes of the Article

The method comprises inferring the set of attributes of the article corresponding to the set of in-process parameters. That is, the set of spatially resolved attributes is inferred from the corresponding set of spatially resolved in-process parameters. Generally, an attribute comprises and/or is a property, as described above. In one example, the inferred respective attributes of the set thereof are the same property as the estimated property, notwithstanding that the inferred respective attributes are spatially resolved. For example, the inferred respective attributes of the set thereof may be spatially resolved tensile strengths and the estimated property may be bulk tensile strength of the article. In one example, the inferred respective attributes of the set thereof are a different property to the estimated property, notwithstanding that the inferred respective attributes are spatially resolved and that the estimated property is estimated based, at least in part, on the inferred set of attributes. For example, the respective attributes of the set thereof may be spatially resolved elongations to failure and the estimated property may be fatigue life of the article. In one example, inferring the set of attributes of the article corresponding to the set of in-process parameters comprises inferring the set of attributes of the article corresponding to the set of in-process parameters based, at least in part, post-processing, for example heat treating, of the article.

The respective attributes of the set thereof have the positional information associated therewith. In other words, each inferred attribute is spatially resolved, having associated positional information, for example a coordinate, such as a 3 dimensional, 3D, coordinate or an XYZ coordinate, for example with respect to a datum, as described respect to the obtained parameters. In one example, respective attributes of the set thereof correspond with respective voxels (i.e. volumetric pixels) of the article, wherein the respective positional information is of the respective voxels. In other words, a respective attribute is inferred for each voxel. For example, the inferred tensile strength of a voxel including partial lack of fusion according to the respective obtained in-process parameters will be relatively lower than the inferred tensile strength of an adjacent voxel. That is, rather than characterising the article by a single bulk property, the article is instead characterised at a relatively refined level, for example a microscopic level.

In one example, inferring the set of attributes of the article corresponding to the set of in-process parameters comprises inferring the set of attributes of the article corresponding to the set of in-process parameters using a trained machine learning, ML, algorithm, as described below.

In one example, the method comprises training the ML algorithm, as described below.

For example, the method may comprise:
1. Capturing in-process parameters during AM that are spatially resolved with respect to the article geometry (e.g. optical emissions)
2. Processing these parameters, producing attributes that are spatially resolved with respect to the article geometry (e.g. elongation to failure, fatigue life)
3. Running a simulation that uses these spatially resolved attributes with the article geometry (e.g. CAD) to determine the property of the article (e.g. fatigue life)

ML is applied to build a mathematical model using training data that is then used to process the parameter dataset and output the attribute dataset. For example, in-process parameters may be obtained during AM of multiple mechanical coupons (i.e. articles) using different processing conditions. These mechanical coupons are tested and their mechanical properties recorded. The ML algorithm is trained with these mechanical properties correlated with the in-process parameters, such that additional in-process parameters input to the model would output/predict associated attributes. In this example, the training data are obtained from tensile coupons; from a mechanical perspective, the central region of a coupon (the gauge length or gauge volume) is used in the determination of the mechanical properties, so the corresponding in-process parameter set is spatially associated with this region.

Model

In one example, the method comprises providing a model of the article. It should be understood that the model is a geometric representation of the article, such as a computer aided design, CAD, model of the article or a measured model of the article.

In one example, estimating the property of the article based, at least in part, on the inferred set of attributes comprises estimating the property of the article based, at least in part, on the inferred set of attributes and the provided model. In this way, simulation, such as structural and/or thermal simulation, of the article may be performed, using the inferred set of attributes and/or the estimated property.

In one example, providing the model of the article comprises accessing a computer aided design, CAD, model of the article, for example according to a STL model of the article. That is, the model is a design model. Using a design model is relatively simpler for computation.

In one example, providing the model of the article comprises acquiring a set of measurements of the article. That is, the model is acquired by measuring the article and thus is a geometric representation of the actual, measured article. Using a measured model may provide a more accurate and/or precise estimate of the property.

In one example, acquiring the set of measurements of the article comprises coordinate measurement, for example using a contact or a non-contact coordinate measurement machine, CMM, for example computed tomography, CT, such as X-ray CT. Contact CMMs are known and include bridge, cantilever, gantry and horizontal arm CMMs. Non-contact CMMs are known and include laser scanners, structured light scanners and CT scanners. In one example, the coordinate measurement is 2D or 3D coordinate measurement, preferably 3D coordinate measurement, for example reconstructed from a plurality of 2D coordinate measurements.

Estimating the Property

The method comprises estimating the property of the article based, at least in part, on the inferred set of attributes. That is, the property of the article is estimated (i.e. calculated, computed, determined) using the inferred set of spatially resolved attributes. In this way, the estimated property is specifically of the particular article and hence accounts for heterogeneity, anisotropy, defects and/or geometry of the particular article, as inferred from the set of spatially resolved in-process parameters.

In one example, estimating the property of the article based, at least in part, on the inferred set of attributes comprises estimating the property of the article using the inferred set of attributes, a model of the article and/or a property, for example the same property, of the feed material.

In one example, estimating the property of the article based, at least in part, on the inferred set of attributes comprises finite element analysis, FEA, of the article using the inferred set of attributes. It should be understood that FEA also uses a model of the article and/or a property, for example the same property, of the feed material. FEA is known.

In one example, the FEA comprises generating a mesh from the model, for example a design model or a measured model.

In one example, the FEA uses the positional information associated with the inferred set of attributes, and optionally does not comprise generating a mesh. For example, the FEA may directly use voxel data, for example from the AM.

In one example, the FEA comprises mechanical (i.e. structural) simulation of the article. In this way, application of static and/or dynamic loads to the article may be simulated, using the inferred set of spatially resolved attributes and hence accounting for heterogeneity, anisotropy, defects and/or geometry of the particular article. In this way, simulated behaviour of individual articles may be assessed, thereby enabling predictions of mechanical performance of the individual articles in service, at relatively higher accuracies and/or precisions compared with conventional simulations. For example, fatigue life of an aerospace components such as a wing spar (i.e. an article), manufactured by AM, may be predicted.

In one example, the FEA comprises thermal simulation of the article. In this way, heat flow in the article may be simulated, using the inferred set of spatially resolved attributes and hence accounting for heterogeneity, anisotropy, defects and/or geometry of the particular article. In this way, simulated behaviour of individual articles may be assessed, thereby enabling predictions of thermal performance of the individual articles in service, at relatively higher accuracies and/or precisions compared with conventional simulations.

Method of Determining a Property of an Assembly Comprising a Set of Articles

The second aspect provides a method of determining a property of an assembly comprising a set of articles, the method implemented, at least in part, by a computer comprising a processor and a memory, the method comprising estimating properties of the respective articles of the set thereof according to the first aspect.

It should be understood that the respective articles of the set thereof are manufactured, at least in part, by AM.

In this way, the property of the assembly may be determined, (i.e. estimated, predicted, calculated, computed), relatively more accurately and/or precisely, for example before assembling the assembly and/or before replacing a particular article of the set thereof in the assembly, such as during maintenance.

In one example, at least a subset of the respective articles of the set thereof are mutually coupled, for example mechanically, adhesively and/or by fusion (such as welding).

In one example, determining the property of the assembly comprises FEA of the assembly, generally as described with respect to FEA of the article, mutatis mutandis.

Method of Training a ML Algorithm

The third aspect provides a method of training a machine learning, ML, algorithm, the method implemented, at least in part, by a computer comprising a processor and a memory, the method comprising:

providing training data comprising sets of in-process parameters of AM of a set of articles including a first article and corresponding sets of properties of the set of articles; and training the ML algorithm using the provided training dataset.

The sets of in-process parameters, the additive manufacturing, the articles and/or the properties may be as described with respect to the first aspect.

Suitable ML algorithms are known.

In one example, providing the training data comprising the sets of in-process parameters of the AM of the set of articles comprises AM of the set of articles according to predetermined sets of input parameters. That is, the articles are manufactured under different AM conditions and the in-process parameters obtained therefrom. In this way, the ML algorithm is trained using the input parameters, the in-process parameters and the properties of the AM articles.

In one example, providing the training data comprising the corresponding sets of properties of the set of articles comprises non-destructive testing, NDT, and/or destructive testing, DT, of the set of articles.

Generally, articles manufactured by AM may be inspected by NDT including ultrasonic, infrared, eddy current, radiographic, dye penetrant, magnetic particle and/or optical inspection. Generally, articles manufactured by AM may be tested by DT including mechanical property testing. Such testing is known.

Trained ML Algorithm

The fourth aspect provides a machine learning, ML, algorithm trained according to the method of the third aspect.

Computer, Computer Program and Non-Transient Computer-Readable Storage Medium

The fifth aspect provides a computer comprising a processor and a memory configured to implement a method according to the first aspect, the second aspect and/or the third aspect.

The sixth aspect provides a computer program comprising instructions which, when executed by a computer comprising a processor and a memory, cause the computer to perform a method according to the first aspect, the second aspect and/or the third aspect.

The seventh aspect provides a non-transient computer-readable storage medium comprising instructions which, when executed by a computer comprising a processor and a memory, cause the computer to perform a method according to the first aspect, the second aspect and/or the third aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
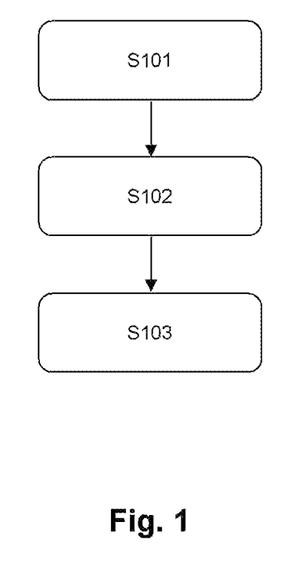
FIG. 1 schematically depicts a method according to an exemplary embodiment.

FIG. 1 schematically depicts a method according to an exemplary embodiment.

The method is of estimating a property of an article manufactured, at least in part, by additive manufacturing, AM, preferably directed energy deposition, DED, and/or powder bed fusion, PBF. The method is implemented, at least in part, by a computer comprising a processor and a memory.

At S101, the method comprises obtaining a set of in-process parameters of the AM of the article, wherein respective parameters of the set thereof have positional information associated therewith.

At S102, the method comprises inferring a set of attributes of the article corresponding to the set of in-process parameters, wherein respective attributes of the set thereof have the positional information associated therewith.

At S103, the method comprises estimating the property of the article based, at least in part, on the inferred set of attributes.

The method may include any of the steps as described with respect to the first aspect.

Figure 2:
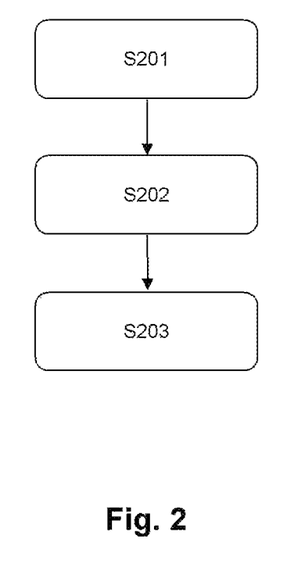
FIG. 2 schematically depicts a method according to an exemplary embodiment.

FIG. 2 schematically depicts a method according to an exemplary embodiment.

By way of example, structural simulation, such as finite element analysis, FEA, is typically applied to an idealised, perfect article geometry such as by generating a volumetric mesh from a computer aided design, CAD, model and uses generalised bulk mechanical property data. The simulation may be used to predict mechanical performance of the article based on one or more input load conditions. In order to predict the mechanical performance of the article, the mechanical properties of the article are required. Direct measurement of the mechanical properties of the article, for example of the material thereof, is invariably destructive and thus cannot be performed for an in-service article. Hence, for design and simulation, generalised bulk mechanical properties are applied from look-up tables for a known material condition, and these embed a measure of safety to account for variabilities in supply and process.

However, spatially resolved parameters may be obtained from the AM, for example using sensors that directly or indirectly measure outputs during the AM in real-time, such as optical and/or acoustic emissions of laser (or other power source) interaction with the feed material for the AM. These in-process parameters (for example, measurements) may be correlated with the resultant mechanical properties of the article. For example, Machine Learning, ML, methods may be used to predict bulk mechanical properties from the in-process parameters. With appropriate validation, the 'measured' property removes some of the variability assumptions embedded in conventional look-up tables and provides a more representative basis for predicting behaviour of the particular article.

Hence, the method according to the first aspect derives mechanical properties from in-process measurements, obtained during the AM of the article, to enhance the fidelity—and by inference the accuracy—of a structural simulation, for example. In the simplest embodiment, the derived mechanical property may be a more refined bulk property particular to the article, but a more interesting concept uses a spatially resolved multitude of mechanical property values aligned to the article geometry, and potentially directionality thereof.

The inferred set of spatially resolved attributes of the article may be further combined with the actual measured geometry of the article, for example acquired using techniques such as X-ray computerised tomography, CT, thereby substituting for the idealised CAD geometry. In this way, fidelity of the simulation is further enhanced.

Many AM processes involve thermal processing of a material by means of a laser, electron beam or electric arc (as examples) that is traversed in such a manner as is required to generate the desired article. For a time-invariant energy input, the temperature of the material at the point of interaction will be dominated by conductive losses to the surrounding material. For example, building directly off a substrate (also known as a base plate or plate), the relatively large mass of the plate will conduct heat away from the interaction zone, resulting in a comparative reduction of the material temperature at the point of interaction. As the build progresses away from the plate, the mass of material local to the point of interaction progressively decreases, and a comparative increase of the material temperature at the point of interaction results. As the resultant mechanical properties of a material are influenced by the thermal cycle experienced during processing, there will be then variation of properties throughout the build. Similar thermal effects during the build occur with geometrical features such as blind walls, junctions etc. that will also result in localised variations.

Emissions from the locality of the laser-material interaction are likely to have some dependency on the temperature. For example, black body radiation (intensity and spectral peak) is a function of temperature, though it is accepted the optical emission from the interaction region for an AM process is much more complex. By processing the in-process parameters using ML or other techniques and separately correlating this to known mechanical values, then mechanical properties may be spatially resolved with respect to the resultant article geometry. A further extension of this would take into account the directional aspect of mechanical properties in AM structures, which tend to be anisotropic due to the layer by layer building approach.

Subsequent structural simulation based on the actual part geometry together with specific material property information (either bulk or spatially resolved) further enhances the fidelity of the simulation.

For example, the method improves the accuracy of structural simulation of additively manufactured articles based on measurement of spatially resolved mechanical properties, derived or inferred from in-process measurements during the AM, optionally combined with the actual article geometry. By enhancing the accuracy of the structural simulation, higher fidelity service life prediction may be estimated at time of manufacture, and/or remaining service life may be more accurately predicted, based on loading history of the article. Additionally and/or alternatively, the method may be used to evaluate loading scenarios outside of and original design scope. This information is valuable for predictive maintenance of critical articles.

In this example, the method is of estimating a fatigue life (i.e. a property) of an aircraft component, particularly a bracket, (i.e. an article) manufactured by additive manufacturing, AM, particularly laser powder bed fusion, L-PBF. The method is implemented, at least in part, by a computer comprising a processor and a memory.

In this example, the feed material is a Ti-6Al-4V alloy powder, particularly Carpenter CT PowderRange Ti64 S (Ti-6Al-4V) Grade 23, having a particle size distribution as shown in Table 1.

TABLE 1

Particle size distribution for CT PowderRange Ti64 S.

| Size | Value | Method |
| --- | --- | --- |
| −15 µm | 10 Volume % | Laser Size Diffraction |
| +45 µm | 15 Weight % | Sieve Analysis |
| D10 | 10-18 µm | Laser Size Diffraction |
| D50 | 26-28 µm | Laser Size Diffraction |

In this example, the AM is performed using a RenAM 500Q® including MeltVIEW® and LaserView® with InfiniAM Spectral software (available from Renishaw plc, UK), having 4×500 W lasers dynamically focused with 80 µm spot size at the powder surface and layer thicknesses typically in the range 20-60 µm. MeltVIEW monitors melt pool emissions across a wide spectral range. A co-axial optical configuration gives a field of view which is determined by the laser scanning system ensuring the melt pool remains in focus of the visible light photodiode sensor throughout the build. LaserVIEW measures the input of the laser using an infra-red photodiode sensor.

In this example, a set of measurements of the article are acquired using non-contact CMM, particularly X-ray CT, using a XT H 225 ST (available from Nikon Metrology Europe NV, Belgium), having a 3 µm focal spot size up to 7 W and a 225 µm focal spot size at 225 W, and equipped with a Varian 2520Dx detector having 1950×1500 active pixels and a pixel size of 127 µm.

The spatial resolution of the in-process parameters may be defined by the MeltVIEW data and/or the X-ray CT data.

At S201, the method comprises obtaining a set of in-process parameters of the AM of the article, wherein respective parameters of the set thereof have positional information associated therewith. In this example, the in-process parameters are obtained from MeltVIEW and LaserVIEW.

At S202, the method comprises inferring a set of attributes of the article corresponding to the set of in-process parameters, wherein respective attributes of the set thereof have the positional information associated therewith. In this example, the respective attributes of the set thereof are spatially resolved elongations to failure. In this, inferring the set of attributes of the article corresponding to the set of in-process parameters comprises inferring the set of attributes of the article corresponding to the set of in-process parameters using a trained ML algorithm. In this example, training data provided from DT, particularly tensile testing, of a set of training articles. In this example, training the ML algorithm comprises semi-supervised training using a Gaussian Mixture Model (GMM).

At S203, the method comprises estimating the property of the article based, at least in part, on the inferred set of attributes. In this example, the property is the fatigue life. In this example, the method comprises providing a model of the article comprising acquiring a set of measurements of the article using the XT H 225 ST. In this example, estimating the property of the article based, at least in part, on the inferred set of attributes comprises FEA of the article using the inferred set of attributes and the provided, measured model. That is, in this example, the fatigue life of the AM structural bracket is estimated by FEA mechanical simulation combining the inferred tensile strengths, derived from the in-process measurements, and the actual article geometry.

While this example relates to L-BPF, the method is applicable to any metal-based AM process, for example PBF and DED such as powder-DED and wire-DED.

Furthermore, while this example relates to a single material build, the method is more generally applicable to graded material AM, in which there is a graded transition from the first material to a second material and a corresponding change in mechanical properties. In-process monitoring may be applied similarly to infer spatially resolved attributes in such builds.

Although a preferred embodiment has been shown and described, it will be appreciated by those skilled in the art that various changes and modifications might be made without departing from the scope of the invention, as defined in the appended claims and as described above.

In summary, the invention provides a method to improve the accuracy of structural simulation of additively manufactured articles based on measurement of mechanical properties, derived from in-process measurements during the article manufacture, optionally in combination with the actual article geometry (as compared to an idealised CAD model). Applied in a structural simulation, for example FEA, this information presents an opportunity to realise highly accurate prediction of mechanical performance, individual to the specific, as manufactured, article.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of estimating a mechanical property of an article manufactured, at least in part, by additive manufacturing, AM, the method implemented, at least in part, by a computer comprising a processor and a memory, the method comprising:
    obtaining a set of in-process parameters of the AM of the article, wherein respective parameters of the set thereof are spatially resolved, having positional information associated therewith and wherein obtaining the set of in-process parameters of the AM of the article comprises monitoring optical, thermal, and/or acoustic emissions during the AM of the article;
    inferring a set of attributes of the article corresponding to the set of in-process parameters, wherein respective attributes of the set thereof are spatially resolved, having the positional information associated therewith and wherein the respective attributes of the set thereof are spatially resolved mechanical properties of the article; and
    estimating the mechanical property of the article based, at least in part, on the inferred set of attributes;
    wherein the mechanical property of the article is a fatigue life of the article;
    wherein the spatially resolved mechanical properties of the article are selected from a group consisting of: a compressive strength, a creep, an elasticity, an elastic limit, a fatigue life, a fatigue limit, a flexibility, a flexural modulus, a flexural strength, a fracture toughness, a hardness, a shear modulus, a shear strength, a specific modulus, a specific strength, a stiffness, a tensile strength, a toughness, an ultimate tensile strength, a yield strength and a Young's modulus;
    wherein inferring the set of attributes of the article corresponding to the set of in-process parameters comprises inferring the set of attributes of the article corresponding to the set of in-process parameters using a trained machine learning, ML, algorithm; and
    wherein estimating the property of the article based, at least in part, on the inferred set of attributes comprises finite element analysis, FEA, of the article using the inferred set of attributes.

2. The method according to claim 1, wherein the spatially resolved mechanical properties of the article and the mechanical property of the article are different.

3. The method according to claim 1, wherein obtaining the set of in-process parameters of the AM of the article comprises sourcing input parameters of the AM of the article and/or readback parameters during the AM of the article.

4. The method according to claim 1, wherein the spatially resolved mechanical properties of the article are selected from the group consisting of: a tensile strength.

5. The method according to claim 1, further comprising providing a model of the article, wherein the model of the article is a geometric representation of the article and wherein estimating the property of the article based, at least in part, on the inferred set of attributes comprises estimating the property of the article based, at least in part, on the inferred set of attributes and the provided model.

6. The method according to claim 5, wherein providing the model of the article comprises acquiring a set of measurements of the article, wherein acquiring the set of measurements of the article comprises coordinate measurement.

7. The method according to claim 1, wherein the estimated mechanical property results, at least in part, from heterogeneity, anisotropy, defects and/or geometric deviations due, at least in part, to the AM.

8. A method of determining a mechanical property of an assembly comprising a set of articles, the method implemented, at least in part, by a computer comprising a processor and a memory, the method comprising estimating mechanical properties of the respective articles of the set thereof according to claim 1.

9. A computer comprising a processor and a memory configured to implement a method according to claim 1, a computer program comprising instructions which, when executed by a computer comprising a processor and a memory, cause the computer to perform a method according to claim 1, or a non-transient computer-readable storage medium comprising instructions which, when executed by a computer comprising a processor and a memory, cause the computer to perform a method according to claim 1.

10. The method according to claim 1, wherein the inferring and estimating steps are performed following the completion of additive manufacturing of the article.

11. A method of estimating a mechanical property of an article manufactured, at least in part, by additive manufacturing, AM, the method implemented, at least in part, by a computer comprising a processor and a memory, the method comprising:
    obtaining a set of spatially resolved in-process parameters of the AM of the article during the AM, substantially in real-time, wherein the in-process parameters comprise optical and thermal emissions from a melt pool region and are associated with voxel-based positional data for the article geometry;
    inferring a set of spatially resolved attributes of the article corresponding to the set of in-process parameters using a trained machine learning algorithm, wherein the respective attributes of the set thereof are spatially resolved mechanical properties of the article that account for anisotropy and heterogeneity induced by the AM process;

obtaining a model of the article geometry via coordinate measurement of the finished article using a contact or non-contact coordinate measuring machine; and estimating the mechanical property of the article using finite element analysis based on the inferred attributes and the model, thereby simulating structural performance of the article under specified loading conditions;

wherein the spatially resolved mechanical properties of the article and the mechanical property of the article are each selected from a group consisting of: a brittleness, a bulk modulus, a coefficient of restitution, a compressive strength, a creep, density, a ductility, a durability, an elasticity, an elastic limit, a fatigue life, a fatigue limit, a flexibility, a flexural modulus, a flexural strength, a fracture toughness, a friction coefficient, a hardness, a malleability, a mass diffusivity, a plasticity, a Poisson's ratio, a resilience, a shear modulus, a shear strength, a slip, a specific modulus, a specific strength, a specific weight, a stiffness, a surface roughness, a tensile strength, a toughness, an ultimate tensile strength, a viscosity, a yield strength, and a Young's modulus.

\* \* \* \* \*